United States Patent
Yamamoto et al.

(10) Patent No.: US 11,258,075 B2
(45) Date of Patent: Feb. 22, 2022

(54) FUEL CELL ELECTRODE CATALYST

(71) Applicant: TOYOTA JIDOSHA KABUSHIKI KAISHA, Toyota (JP)

(72) Inventors: Toru Yamamoto, Ushiku (JP); Tetsuo Nagami, Nagoya (JP); Kazunobu Ishibashi, Toyota (JP); Hiromitsu Tanaka, Nagakute (JP); Yoichi Hosokawa, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 225 days.

(21) Appl. No.: 15/835,789

(22) Filed: Dec. 8, 2017

(65) Prior Publication Data

US 2018/0166697 A1 Jun. 14, 2018

(30) Foreign Application Priority Data

Dec. 9, 2016 (JP) .............................. JP2016-239615
Dec. 6, 2017 (JP) .............................. JP2017-234536

(51) Int. Cl.
*H01M 4/00* (2006.01)
*H01M 4/92* (2006.01)
(Continued)

(52) U.S. Cl.
CPC ............. *H01M 4/926* (2013.01); *C01B 32/00* (2017.08); *C01B 32/20* (2017.08); *C08L 67/02* (2013.01);
(Continued)

(58) Field of Classification Search
CPC ..... H01M 4/926; H01M 8/1004; C01B 32/00; C01B 32/20; C08L 67/02; C08L 2203/20; C01P 2006/16; Y02E 60/50
See application file for complete search history.

(56) References Cited

U.S. PATENT DOCUMENTS 6,042,643 A * 3/2000 Belmont .................. C09D 7/41
106/472
2007/0184334 A1 8/2007 Hong et al.
(Continued)

FOREIGN PATENT DOCUMENTS

CN 1617765 A 5/2005
CN 101462076 A 6/2009
(Continued)

OTHER PUBLICATIONS

U.S. Department of Energy. (Jun. 2013). Fuel Cell Technical Team Roadmap. Retrieved from https://www1.eere.energy.gov/vehiclesandfuels/pdfs/program/fctt_roadmap_june2013.pdf (Year: 2013).*

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

A fuel cell electrode catalyst includes: a noble-metal-supported catalyst including a carbon support and a noble metal supported on the carbon support; and a water-repellent material with which the noble-metal-supported catalyst is modified. The carbon support is mesoporous carbon in which a pore volume of pores having a pore size of 2 nm to 5 nm is 2.1 ml/g to 2.4 ml/g. An amount of the water-repellent material is 3% by weight to 7% by weight with respect to a total weight of the mesoporous carbon and the water-repellent material.

3 Claims, 5 Drawing Sheets

(51) Int. Cl.
*C01B 32/20* (2017.01)
*C08L 67/02* (2006.01)
*C01B 32/00* (2017.01)
*H01M 8/1004* (2016.01)

(52) U.S. Cl.
CPC ....... *C01P 2006/16* (2013.01); *C08L 2203/20* (2013.01); *H01M 8/1004* (2013.01)

(56) References Cited

U.S. PATENT DOCUMENTS

| | | | |
|---|---|---|---|
| 2009/0208751 A1* | 8/2009 | Green | B82Y 30/00 428/402 |
| 2011/0058308 A1 | 3/2011 | Nishi et al. | |
| 2011/0223494 A1 | 9/2011 | Feaver et al. | |
| 2016/0064744 A1 | 3/2016 | Mashio et al. | |
| 2017/0183435 A1* | 6/2017 | Ino | C08F 214/26 |
| 2017/0187047 A1 | 6/2017 | Mizutani et al. | |
| 2017/0194652 A1 | 7/2017 | Iijima et al. | |

FOREIGN PATENT DOCUMENTS

| | | |
|---|---|---|
| CN | 102007186 A | 4/2011 |
| JP | 04-264367 A | 9/1992 |
| JP | 10-270053 A | 10/1998 |
| JP | 2003-503533 | 6/2003 |
| JP | 2005-294088 A | 10/2005 |
| JP | 2006-504508 A | 2/2006 |
| JP | 2007-149503 A | 6/2007 |
| JP | 2007-209979 A | 8/2007 |
| JP | 2008-041498 A | 2/2008 |
| JP | 2008-041498 A | 2/2008 |
| JP | 2012-129059 A | 7/2012 |
| JP | 2015-071784 A | 4/2015 |
| WO | WO 03/057367 A2 | 7/2003 |
| WO | WO 2007/108497 A1 | 9/2007 |
| WO | WO 2009/075264 A1 | 6/2009 |
| WO | WO 2009/105172 A2 | 8/2009 |
| WO | WO 2014/175101 A1 | 10/2014 |

OTHER PUBLICATIONS

Barrett et al., "The Determination of Pore Volume and Area Distributions in Porous Substances. I. Computations from Nitrogen Isotherms," J. Am. Chem. Soc., 1951, vol. 73, pp. 373-380.

Watanabe et al., "New Preparation Method of a High Performance Gas Diffusion Electrode Working at 100% Utilization of Catalyst Clusters and Analysis of the Reaction Layer," J. Electroanal. Chem., 197 (1986), pp. 195-208.

U.S. Appl. No. 15/384,551, filed Dec. 20, 2016.

Office Action issued in U.S. Appl. No. 15/384,551 dated Mar. 6, 2017.

Office Action issued in U.S. Appl. No. 15/384,551 dated Jun. 20, 2017.

Office Action issued in U.S. Appl. No. 15/384,551 dated Sep. 25, 2017.

Office Action issued in U.S. Appl. No. 15/384,551 dated Feb. 12, 2018.

Office Action issued in U.S. Appl. No. 15/384,551 dated Sep. 6, 2018.

Office Action issued in U.S. Appl. No. 15/384,551 dated Dec. 21, 2018.

Office Action issued in U.S. Appl. No. 15/384,551 dated Mar. 22, 2019.

Office Action issued in U.S. Appl. No. 15/384,551 dated Aug. 9, 2019.

Office Action issued in U.S. Appl. No. 15/384,551 dated Nov. 27, 2019.

Office Action issued in U.S. Appl. No. 15/384,551 dated Mar. 25, 2020.

Final Office Action issued in U.S. Appl. No. 15/384,551 dated Jul. 13, 2020.

Office Action issued in U.S. Appl. No. 15/384,551 dated Nov. 25, 2020.

Park, Young-Chul et al., "Effects of Carbon Supports on Pt Distribution, Ionomer Coverage and Cathode Performance for Polymer Electrolyte Fuel Cells," Journal of Power Sources 315 (2016); p. 179-191 (2016).

Park, Young-Chul et al., "Effects of Short-Side-Chain Perfluorosulfonic Acid Ionomers as Binders on the Performance of Low Pt Loading Fuel Cell Cathodes," Journal of Power Sources 275 (2015); p. 384-391 (2015).

Ito, Toshihiko et al., "Three-Dimensional Spatial Distributions of Pt Catalyst Nanoparticles on Carbon Substrates in Polymer Electrolyte Fuel Cells," Electrochemistry 79, No. 5 (2011); p. 374-376 (2011).

Advisory Action issued in U.S. Appl. No. 15/384,551 dated Oct. 20, 2020.

Final Office Action issued in U.S. Appl. No. 15/384,551 dated Jul. 27, 2021.

Advisory Action issued in U.S. Appl. No. 15/384,551 dated Nov. 2, 2021.

* cited by examiner

EXAMPLE 1

COMPARATIVE EXAMPLE 5

FUEL CELL ELECTRODE CATALYST

INCORPORATION BY REFERENCE

The disclosure of Japanese Patent Application No. 2017-234536 filed on Dec. 6, 2017 including the specification, drawings and abstract is incorporated herein by reference in its entirety.

BACKGROUND

1. Technical Field

The disclosure relates to a fuel cell electrode catalyst. More specifically, the disclosure relates to an electrode catalyst included in a membrane electrode assembly for various kinds of electrochemical devices, such as a polymer electrolyte fuel cell.

2. Description of Related Art

A polymer electrolyte fuel cell includes, as a basic unit, a membrane electrode assembly (hereinafter, also referred to as "MEA") including a solid polymer electrolyte membrane and electrodes joined respectively to opposite surfaces of the solid polymer electrolyte membrane. In a polymer electrolyte fuel cell, an electrode usually has a bilayer structure including a diffusion layer and a catalyst layer.

A diffusion layer is a layer through which reactive gas is supplied to a catalyst layer and in which exchange of electrons takes place. A diffusion layer is made of a porous and electron-conductive material. A catalyst layer is a layer in which an electrode reaction is caused by an electrode catalyst included in the catalyst layer. A three-phase interface in which three phases, that is, an electrolyte, a catalyst, and reactive gas, coexist is required to promote an electrode reaction. Therefore, a catalyst layer is usually composed of a layer including a catalyst (here, "catalyst" means not only a catalyst acting by itself but also a noble metal catalyst supported on a support (hereinafter, also referred to as "noble-metal-supported catalyst") and the like) and an electrolyte containing the same components as those of a solid polymer electrolyte membrane.

There are some issues that need to be resolved in order to put a polymer electrolyte fuel cell into practical use as, for example, an in-vehicle power source.

For example, every solid polymer electrolyte requires water to achieve protonic conductivity. Therefore, the following method is usually adopted for a polymer electrolyte fuel cell. According to the method, reactive gas to be supplied to electrodes is humidified by an auxiliary machine, such as a water vapor generator or a mist generator, and the water content of a solid polymer electrolyte membrane is adjusted by controlling the humidity. However, in a case where reactive gas is humidified by an auxiliary machine, if the fuel cell operating conditions become highly-humidified conditions, excessive water remains in the electrodes. Furthermore, while protons move through the electrolyte membrane from the fuel electrode toward the air electrode, water also moves toward the air electrode together with the protons. Moreover, water is produced through an electrode reaction in the air electrode. If the water is left uncontrolled, a three-phase interface in a catalyst layer is clogged with the water, that is, so-called "flooding" occurs. Flooding may lead to reduction in the gas diffusibility of the catalyst layer, resulting in a decrease in the power density of a fuel cell.

In order to resolve these issues, methods for enhancing the water repellency of a catalyst layer thereby reducing the occurrence of flooding have been proposed.

For example, the following methods (1) to (7) have been proposed.

(1) A method of adding a polytetrafluoroethylene (hereinafter, also referred to as "PTFE") suspension to catalyst ink (see paragraph 0013 of Japanese Unexamined Patent Application Publication No. 04-264367).

(2) A method of adding carbon black on which PTFE is supported to catalyst ink (see Journal of Electroanalytical Chemistry, vol. 197, p. 195, (1986)).

(3) A method of mixing a low-molecular-weight fluorine-containing solvent with catalyst ink (see Journal of Technical Disclosure No. 2003-503533, Japan Institute of Invention and Innovation).

(4) A method of attaching a fluorocarbon resin material on electrode powder surfaces through sputter deposition (see Japanese Unexamined Patent Application Publication No. 10-270053).

(5) A method of disposing a water-repellent layer including electroconductive particles having surfaces that are entirely covered with a water-repellent polymer, between a catalyst layer and a gas diffusion layer (see Japanese Unexamined Patent Application Publication No. 2005-294088).

(6) A method of forming a coating layer made of a water-repellent material on surfaces of electroconductive catalyst particles used in a catalyst layer (see Japanese Unexamined Patent Application Publication No. 2007-209979).

(7) A method of coating surfaces of composite particles including a catalyst used in a catalyst layer and a cation-exchange resin, with a water-repellent material, and forming voids having a prescribed size between the coated particles (see Japanese Unexamined Patent Application Publication No. 2007-149503).

SUMMARY

In general, a noble-metal-supported catalyst including a support, such as carbon black, and a noble metal, such as platinum, supported on the support is used in a catalyst layer.

As described above, a catalyst layer is a layer in which an electrode reaction is caused by bringing an electrode catalyst included therein into contact with reactive gas supplied from a diffusion layer. In order to cause an electrode reaction more efficiently, a catalyst layer itself preferably has high gas diffusibility (low gas diffusion resistance). In the case of, for example, a catalyst layer including a noble-metal-supported catalyst as an electrode catalyst, a support used in the noble-metal-supported catalyst preferably includes pores for supporting noble metal particles and has high gas diffusibility, so that the noble metal particles and reactive gas easily come into contact with each other.

However, there has been no detailed report on a composite material of a noble-metal-supported catalyst ill which a porous material including small-sized pores, for example, a mesoporous material is used as a support, and a water-repellent material. Therefore, in a catalyst layer of a membrane electrode assembly (MEA), a porous material including small-sized pores cannot be used as a support of a noble-metal-supported catalyst.

The disclosure provides a fuel cell electrode catalyst having improved gas diffusibility and enhanced water repellency.

Examples of a porous material including small-sized pores include mesoporous carbon. Mesoporous carbon is a carbon material including a large number of fine pores (several nm) and having high gas diffusibility.

However, mesoporous carbon is disadvantageous in that humidifying water and produced water are easily accumulated in a large number of fine pores, resulting in poor drainage.

Poor drainage causes flooding as described above. Flooding may lead to reduction in the gas diffusibility of a catalyst layer, resulting in a decrease in the power density of a fuel cell.

FIG. 6 shows the relationship between the voltage of the MEA and the ratio of an amount of adsorbed water vapor at a point that is on a desorption isotherm and that corresponds to a relative pressure of $P/P_0=0.75$ with respect to an amount of adsorbed water vapor at a point that is on an adsorption isotherm and that corresponds to a relative pressure of $P/P_0=0.75$ (an amount of adsorbed water vapor at the time of desorption/an amount of adsorbed water vapor at the time of adsorption) [hereinafter, referred to as a water vapor adsorption-desorption hysteresis value] in the catalyst used in the MEA was calculated. It is evident that the cell performance of MEA is reduced if the catalyst has a large water vapor adsorption-desorption hysteresis value, i.e., has a difficulty in desorbing the adsorbed water vapor (poor drainage).

In view of this, the present inventors modified a noble-metal-supported catalyst in which mesoporous carbon is used as a support, with a water-repellent material in order to minimize the disadvantage that mesoporous carbon has poor drainage while maintaining the advantage that mesoporous carbon has high gas diffusibility. The results revealed the fact that the characteristics of an MEA prepared using the noble-metal-supported catalyst modified with the water-repellent material respond sensitively to an amount of the water-repellent material. This is probably due to a large number of fine pores of the mesoporous carbon.

Further, the present inventors found a fact that, in a fuel cell electrode catalyst containing: a noble-metal-supported catalyst including a carbon support and a noble metal supported on the carbon support; and a water-repellent material with which the noble-metal-supported catalyst is modified, when mesoporous carbon in which a pore volume of pores having a pore size of 2 nm to 5 nm is 2.1 ml/g to 2.4 ml/g is used as the carbon support, and the amount of the water-repellent material is adjusted to 3% by weight to 7% by weight with respect to the total weight of the mesoporous carbon and the water-repellent material, the water repellency of the electrode catalyst can be enhanced while the gas diffusibility of the mesoporous carbon is maintained, and found a fact that high voltage performance can be achieved in the MEA prepared using the electrode catalyst. Thus, the present inventors completed an embodiment of the disclosure.

An aspect of the disclosure relates to a fuel cell electrode catalyst including: a noble-metal-supported catalyst including a carbon support and a noble metal supported on the carbon support; and a water-repellent material with which the noble-metal-supported catalyst is modified. The carbon support is mesoporous carbon in which a pore volume of pores having a pore size of 2 nm to 5 nm is 2.1 ml/g to 2.4 ml/g. An amount of the water-repellent material is 3% by weight to 7% by weight with respect to a total weight of the mesoporous carbon and the water-repellent material.

The disclosure provides a fuel cell electrode catalyst having improved gas diffusibility and enhanced water repellency. When the electrode catalyst of the disclosure is used in various kinds of electrochemical devices, such as a polymer electrolyte fuel cell, the cell performance of the devices can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
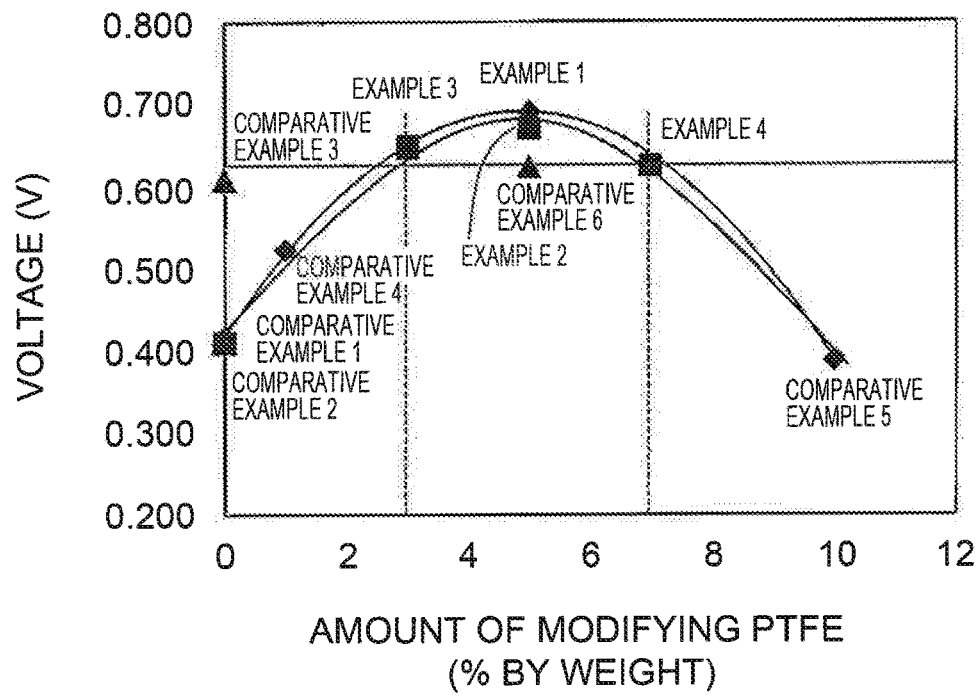
FIG. 1 is a diagram showing the relationship between the amount of modifying PTFE with which a noble-metal-supported catalyst was modified, and the voltage, in each of membrane electrode assemblies (MEAs) of Comparative Examples 1 to 6 and Examples 1 to 4.

An electrode catalyst of the disclosure is not limited by embodiments described below, and various changes and modifications that a person skilled in the art can come up with may be made to the following embodiments within the scope of the disclosure.

An electrode catalyst according to an embodiment of the disclosure contains: a noble-metal-supported catalyst including a carbon support and a noble metal; and a water-repellent material.

The carbon support of the noble-metal-supported catalyst in the electrode catalyst according to the embodiment of the disclosure is mesoporous carbon. The mesoporous carbon includes a large number of fine pores. In the mesoporous carbon, a pore volume of pores having a pore size of 2 nm to 5 nm is 2.1 ml/g to 2.4 ml/g, and is preferably, 2.3 ml/g to 2.4 ml/g.

The pore volume of pores having a pore size of 2 nm to 5 nm in the mesoporous carbon can be measured by, for example, nitrogen adsorption at a liquid nitrogen temperature.

Although the specific surface area of the mesoporous carbon is not limited to any specific values, it is usually 700 $m^2/g$ to 1800 $m^2/g$, and is preferably 900 $m^2/g$ to 1500 $m^2/g$, when measured by, for example, the BET method, in order to improve the gas diffusibility.

The mesoporous carbon can be prepared as described in WO 2009/075264. The mesoporous carbon can be prepared, for example, by burning the mesoporous carbon obtained by a method described in WO 2009/075264, at a burning temperature of 1500° C. or higher and lower than 2300° C., for example, at a burning temperature of 1500° C. or higher and lower than 2100° C., or at a burning temperature of 1700° C. or higher and lower than 2300° C. Burning conditions, such as a temperature increase time, a burning time, a burning gas atmosphere, and a cooling time, may be changed as needed by a person skilled in the art such that the mesoporous carbon is obtained.

The noble metal can be supported in the pores of the mesoporous carbon. The mesoporous carbon has a large number of fine pores. Thus, the noble metal supported in the pores is less likely to be removed from the pores in subsequent processes.

In addition, a large number of fine pores of the mesoporous carbon can improve the gas diffusibility. Thus, the gas diffusibility of an electrode can be further improved through combined use of a catalyst layer including the electrode catalyst according to the embodiment of the disclosure and a conventional diffusion layer in an MEA. Furthermore, size reduction of a fuel cell can be achieved by omitting a diffusion layer from an electrode of an MEA and constituting the electrode of the MEA from only a catalyst layer including the electrode catalyst according to the embodiment of the disclosure.

The noble metal of the noble-metal-supported catalyst in the electrode catalyst according to the embodiment of the disclosure is supported on the mesoporous carbon. The noble metal is supported on a surface of the mesoporous carbon and in the pores of the mesoporous carbon. Most of the noble metal is supported in the pores of the mesoporous carbon. The noble metal is not limited to any specific noble metals as long as the noble metal exhibits a catalytic action in the following reactions in the electrodes of the MEA.

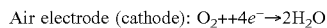

Air electrode (cathode): $O_2 + 4e^- \rightarrow 2H_2O$

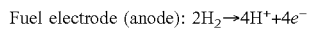

Fuel electrode (anode): $2H_2 \rightarrow 4H^+ + 4e^-$

Any noble metal known in this technical field may be used. Examples of the noble metal include platinum (Pt) and platinum alloys, such as platinum-cobalt (Pt—Co), platinum-nickel (Pt—Ni), and platinum-ruthenium (Pt—Ru).

Although the amount of the noble metal is not limited to any specific amount, it is usually 0.01 mg to 0.5 mg per 1 cm² of an electrode, and is preferably 0.03 mg to 0.3 mg, per 1 cm² of an electrode.

The noble-metal-supported catalyst is modified with the water-repellent material in the electrode catalyst according to the embodiment of the disclosure.

In the disclosure, the term "modified" means that the water-repellent material is present on a surface of the mesoporous carbon. The water-repellent material and the mesoporous carbon are bound to each other by a physical force and/or a chemical force. In the embodiment of the disclosure, preferably, the mesoporous carbon of the noble-metal-supported catalyst is uniformly coated with the water-repellent material as a thin layer having a thickness of, for example, 1 nm or less (calculated value).

The water-repellent material is not limited to any specific material as long as the water-repellent material exhibits water-repellency. Any water-repellent material known in this technical field nay be used. Examples of the water-repellent material include PTFE, a tetrafluoroethylene-perfluoroalkyl vinyl ether copolymer (PFA), and a tetrafluoroethylene-hexafluoropropylene copolymer (FEA). For the electrode catalyst according to the embodiment of the disclosure, the water-repellent material is preferably PTFE.

The amount of the water-repellent material is 3% by weight to 7% by weight with respect to the total weight of the mesoporous carbon and the water-repellent material. The amount of the water-repellent material is preferably 4% by weight to 6% by weight, and is more preferably 4% by weight to 5% by weight, with respect to the total weight of the mesoporous carbon and the water-repellent material.

The water-repellent material in an amount defined as described above does not hinder the contact between the noble metal supported on the mesoporous carbon and reactive gas, while imparting water repellency to the electrode catalyst. That is, the water-repellent material does not inhibit an electrode reaction in the MEA prepared using the electrode catalyst according to the embodiment of the disclosure.

The electrode catalyst according to the embodiment of the disclosure contains: the noble-metal-supported catalyst including the mesoporous carbon defined as described above as the carbon support and the noble metal supported on the mesoporous carbon; and the water-repellent material in an amount defined as described above, with which the noble-metal-supported catalyst is modified. With the electrode catalyst according to the embodiment of the disclosure, the water repellency of the electrode catalyst is enhanced while the noble metal particles of the noble-metal-supported catalyst can easily come into contact with the reactive gas.

The electrode catalyst according to the embodiment of the disclosure may be used in as air electrode and/or a fuel electrode in the MEA. The electrode catalyst according to the embodiment of the disclosure is preferably used as the air electrode where water is easily accumulated, in the MEA.

The electrode catalyst according to the embodiment of the disclosure may be prepared by a method known in this technical field, except that the amounts of the carbon support and the water-repellent materials used in the electrode catalyst are defined as described above. The electrode catalyst according to the embodiment of the disclosure may be prepared, for example, as follows.

(1) Mesoporous carbon in which a pore volume of pores having a pore size of 2 nm to 5 nm is 2.1 ml/g to 2.4 ml/g, and a noble metal precursor are suspended in a solvent, such as pure Water, to obtain a suspension.

(2) The noble metal precursor in the suspension obtained in the process (1) is reduced into a noble metal with a reductant, such as ethanol or sodium borohydride, to obtain a dispersion.

(3) The dispersion obtained in the process (2) is filtered, and an obtained cake is dried at 40° C. to 100° C., for example, at 80° C., for 8 hours or longer, for example, for 10 hours, to obtain powder.

(4) The powder obtained in the process (3) is burned at 200° C. to 1000° C., for example, at 800° C., for 0.5 hours to 5 hours, for example, for 1 hour, under an inert atmosphere, such as a nitrogen atmosphere, to obtain a noble-metal-supported catalyst.

The burning in the process (4) is carried out in order to improve the durability of the noble-metal-supported catalyst when used at a high temperature. The burning is carried out in a temperature range and a time range in which the pore size and the pore volume of the pores of the mesoporous carbon do not change, preferably under the conditions in the process (4).

(5) The noble-metal-supported catalyst obtained in the process (4) is dispersed in a low-boiling inert solvent, such as fluorinated carbon e.g., Fluorinert FC-72 (manufactured by 3M Japan Ltd.)), to obtain dispersion A.

(6) A water-repellent material in an amount of 3% by weight to 7% by weight with respect to the total weight of the mesoporous carbon and the water-repellent material is dispersed in an inert solvent that is the same as that used in the process (5) to obtain dispersion B.

(7) The dispersion A obtained in the process (5) and the dispersion B obtained in the process (6) are mixed together to obtain a mixed solution. In this case, the order in which the dispersions are added is not limited to any specific order, and an addition method is not limited to any specific method.

In the processes (5) to (7), the noble-metal-supported catalyst and the water-repellent material are respectively dispersed in separate inert solvents and then mixed together, in order to mix the noble-metal-supported catalyst and the water-repellent material more uniformly. The mixed solution may be prepared by adding the water-repellent material into the dispersion obtained by dispersing the noble-metal-supported catalyst in the inert solvent, or vice versa, or mixing the mixture of the noble-metal-supported catalyst and the water-repellent material with the inert solvent.

(8) The mixed solution obtained in the process (7) is evaporated to dryness at a temperature equal to or lower than the boiling point of the inert solvent, for example, at 30° C. to 100° C., to obtain an electrode catalyst. Various methods, for example, methods known in this technical field, such as heating, vacuum drying, and spray dryers, may be adopted as a method for evaporation to dryness.

For the electrode catalyst according to the embodiment of the disclosure, preferably; the water-repellent material dissolved in a solvent is mixed with the noble-metal-supported catalyst, so that the mesoporous carbon of the noble-metal-supported catalyst is uniformly coated with the water-repellent material as a thin layer (having a thickness of 1 nm or less).

The electrode catalyst according to the embodiment of the disclosure thus obtained may be used as an electrode catalyst included in an MEA for various kinds of electrochemical devices, such as a polymer electrolyte fuel cell.

For example, an MEA may be prepared as follows, using the electrode catalyst according to the embodiment of the disclosure.

(1) The electrode catalyst according to the embodiment of the disclosure and an electrolyte having the same components as those of a solid polymer electrolyte membrane, for example, Nation® 117, are suspended in a solvent, such as pure water, to prepare catalyst ink. In this case, ultrasonic dispersion or the like may be employed in order to obtain homogeneous catalyst ink.

(2) The catalyst ink obtained in the process (1) is sprayed and attached onto a detachable base material, for example, a Teflon sheet, to form a catalyst layer precursor. The spraying and attachment may be carried out by a method in which gravity, spray force, or electrostatic force is used.

(3) The catalyst layer precursor on the base material is dried to prepare a catalyst layer on the base material. The catalyst layer is detached from the base material to obtain the catalyst layer. In this case, in the processes (2) and (3), the catalyst ink is sprayed and attached onto the base material, followed by drying and detachment to obtain the catalyst layer. Alternatively, the catalyst ink may be sprayed and attached directly onto a surface of a solid polymer electrolyte membrane and then dried to prepare a catalyst layer.

(4) The catalyst layer obtained in the process (3) is used as an air electrode, while, for example, the catalyst layer obtained in the process (3) or a catalyst layer prepared using a commercially available Pt/C catalyst, for example, TEC10E50E (platinum catalyst manufactured by Tanaka Kikinzoku Kogyo K.K.), instead of the catalyst of the process (1) is used as a fuel electrode. The solid polymer electrolyte membrane, for example, Nafion® 117 is sandwiched between the air electrode and the fuel electrode to obtain a layer aggregate. In some cases, a diffusion layer, for example, TGP-H-60 (carbon paper manufactured by Toray Industries, Inc.) may be disposed on the outer side of each of the air electrode and the fuel electrode.

(5) The layer aggregate obtained in the process (4) and having an arrangement of (diffusion layer-)air electrode-solid polymer electrolyte membrane-fuel electrode(-diffusion layer) is pressure-bonded by hot pressing at 100° C. to 200° C., for example, at 140° C., for 5 seconds to 600 seconds, for example, for 300 seconds, to obtain an MEA.

In the MEA thus prepared using the electrode catalyst according to the embodiment of the disclosure, the gas diffusibility is improved due to employment of the mesoporous carbon, whereby the voltage performance is improved. Further, the improved water repellency reduces the occurrence of flooding, thereby further improving the cell performance.

Hereinafter, the disclosure will be described with reference to some Examples. However, the disclosure is not limited to these Examples.

1. Sample Preparation
1-1. Starting Material
1-1-1. Carbon Support

As carbon supports, mesoporous carbon A, mesoporous carbon B, and mesoporous carbon C were prepared.

In the mesoporous carbon A, the specific surface area measured by the BET method was 1000 $m^2/g$, and the pore volume of pores having a pore size of 2 nm to 5 nm, measured by the nitrogen adsorption measurement BJH method, was 2.4 ml/g. The mesoporous carbon A was prepared by subjecting carbon obtained as described in WO 2009/075264 to a heat treatment (carried out at a burning temperature of 1700° C. or higher and lower than 2300° C., after empirically determining the relationship between burning conditions arid the pore volume). Note that, the pore volume can be determined on the basis of a pore size exhibiting the maximum value of a logarithmic derivative pore volume in a pore size distribution curve that indicates the relationship between the pore size (D) of the carbon support and the logarithmic derivative pore volume (dV/d (logD)). The pore volume is a cumulative value of the logarithmic derivative pore volumes (dV/d (logD)) within a range of the pore sizes (D) from 2 nm to 5 nm. When the BJH method is applied, the pore size distribution curve can be obtained, for example, by the following procedures. In nitrogen gas of 77.4 K (boiling point of nitrogen), an amount (ml/g) of the nitrogen gas adsorbed on the carbon support is measured at each pressure P (mmHg) of the nitrogen gas while the pressure P is gradually increased. Subsequently, a value obtained by dividing the pressure P (mmHg) by a saturated vapor pressure $P_0$ (mmHg) of the nitrogen gas is defined as a relative pressure $P/P_0$. The nitrogen gas adsorbed amount corresponding to each relative pressure $P/P_3$ is plotted to obtain an adsorption isotherm. Then, the pore size distribution of the carbon support is determined according to the BJH method from the adsorption isotherm. In this way, the pore size distribution curve can be obtained. As for the BJH method, see, a literature known in the art, for example, J. Am. Chem. Soc., 1951, Vol. 73, pp. 373 to 380.

In the mesoporous carbon B, the specific surface area measured by the BET method was 1000 $m^2/g$, and the pore volume of pores having a pore size of 2 nm to 5 nm, measured by the nitrogen adsorption measurement BJH method, was 2.1 ml/g. The mesoporous carbon B was prepared by subjecting carbon obtained as described in WO 2009/075264 to a heat treatment (carried out at a burning temperature of 1500° C. or higher and lower than 2100° C., after empirically determining the relationship between burning conditions and the pore volume).

In the mesoporous carbon C, the specific surface area measured by the BET method was 800 m$^2$/g, and the pore volume of pores having a pore size of 2 nm to 5 nm, measured by the nitrogen adsorption measurement BJH method, was 1.5 ml/g. The mesoporous carbon C was prepared by subjecting carbon obtained as described in WO 2009/075264 to a heat treatment (carried out at a burning temperature of 2300° C. or higher and lower than 2900° C., after empirically determining the relationship between burning conditions and the pore volume), 1-1-2. Noble Metal Platinum (aqueous platinum nitrate solution (containing Pt of 10% by weight))

Cobalt (aqueous cobalt nitrate solution (containing Co of 20% by weight))

1-1-3 Water-repel lent Material

As a water-repellent material, polytetrafluoroethylene (PTFE) (CEFRAL LUBE V (manufactured by Central Glass Co., Ltd.)) was prepared.

1-2. Preparation of Membrane Electrode Assembly (MEA)

COMPARATIVE EXAMPLE 1

MEA Prepared Using Electrode Catalyst Including PtCo-supported Mesoporous Carbon A (1) Preparation of Noble-metal-supported Catalyst PtCo/C (PtCo-supported Mesoporous Carbon)

(i) First, 100 g of distilled water and 2.5 g of the mesoporous carbon A were placed in a 200 ml beaker, and mixed together by stirring at 40° C. for 15 minutes to obtain a suspension.

(ii) Then, 10 g of an aqueous platinum nitrate solution (containing Pt of 10% by weight) was added as a platinum precursor to the suspension obtained in the process (i) at 80° C., and the platinum precursor was reduced into platinum with 10 g of ethanol to obtain a dispersion.

(iii) Then, the dispersion obtained in the process (ii) was filtered, and the obtained cake was dried at 80° C. for 10 hours to obtain powder.

(iv) Then, the powder obtained in the process (iii) was burned at 800° C. for 1 hour under a nitrogen atmosphere to obtain 3 g of a noble-metal-supported catalyst Pt/C.

(v) Then, 100 g of distilled water and 3 g of the noble-metal-supported catalyst PVC obtained in the process (iv) were placed in a 200 ml beaker, and mixed together by stirring at room temperature for 5 minutes to obtain a suspension.

(vi) Then, 0.5 g of an aqueous cobalt nitrate solution (containing Co of 20% by weight) was added as a cobalt precursor to the suspension obtained in the process (v) at room temperature, and the cobalt precursor was reduced into cobalt by the dropwise addition of 1.5 g of an aqueous sodium borohydride solution (1% by weight) at 0.1 g/min to obtain a dispersion.

(vii) Then, the dispersion obtained in the process (vi) was filtered, and the obtained cake was dried at 80° C. for 10 hours to obtain powder.

(viii) Then, the powder obtained in the process (vii) was burned at 800° C. for 1 hour under a nitrogen atmosphere to prepare 3 g of a noble-metal-supported catalyst PtCo/C, (2) Preparation of Catalyst Ink (i) First, 15 g of distilled water and 2 g of the noble-metal-supported catalyst PtCo/C prepared in the process (1) were placed in a 30 ml beaker, and mixed together by stirring at room temperature for 30 minutes to obtain a suspension.

(ii) Then, 8 g of an ionomer solution (dispersion containing Nation® of 10% by weight) was added to the suspension obtained in the process (i) at room temperature (a weight ratio (I/C) of solid matter (I) of the ionomer solution to the mesoporous carbon (C) in the noble-metal-supported catalyst was adjusted to 0.8), and the mixture was mixed by stirring for 60 minutes to obtain a mixed solution.

(iii) Then, 10 g of ethanol was added to the mixed solution obtained in the process (ii), and the mixture was stirred at room temperature for 120 minutes to obtain a dispersion.

(iv) Then, the dispersion obtained in the process (iii) was ultrasonically dispersed at room temperature for 30 minutes to prepare homogeneous catalyst ink.

(3) Preparation of Catalyst Layer (i) A Teflon sheet was uniformly coated with the catalyst ink prepared in the process (2) using a squeegee such that the weight of platinum per 1 cm$^2$ of a catalyst layer was 0.1 mg (0.1 mg·Pt/cm$^2$) to obtain a catalyst layer precursor on the Teflon sheet.

(ii) The catalyst layer precursor on the Teflon sheet obtained in the process) was dried at 80° C. for 30 Minutes to form a catalyst layer on the Teflon sheet.

(iii) The catalyst layer was detached from the Teflon sheet to prepare a catalyst layer.

(4) Preparation of MEA (i) The catalyst layer prepared in the process (3) was used as an air electrode (cathode), while a catalyst layer prepared using TEC10E50E was Used as a fuel electrode (anode). Then, Nation® 117 was disposed as a solid polymer electrolyte membrane between the air electrode and the fuel electrode to prepare a layer aggregate (air electrode-solid polymer electrolyte membrane-fuel electrode).

(ii) The layer aggregate obtained in the process (i) was pressure-bonded by hot pressing at 140° C. for 300 seconds to prepare an MEA.

COMPARATIVE EXAMPLE 2

MEA Prepared Using Electrode Catalyst Including PtCo-supported Mesoporous Carbon B An MEA was prepared in the same way as in Comparative Example 1 except that the mesoporous carbon B was used instead of the mesoporous carbon A in the process (1)(i) of Comparative Example 1.

COMPARATIVE EXAMPLE 3

MEA Prepared Using Electrode Catalyst Including PtCo-supported Mesoporous Carbon C An MEA was prepared in the same way as in Comparative Example 1 except that the mesoporous carbon C was used instead of the mesoporous carbon A in the process (1)(i) of Comparative Example 1.

COMPARATIVE EXAMPLE 4

MEA Prepared Using Electrode Catalyst Including PtCo-supported Mesoporous Carbon A and PTFE of 1% by Wight with Respect to Total Weight of Mesoporous Carbon A and PTFE {Weight of PTFE/(Weight of Mesoporous Carbon A+Weight of PTFE)×100=1}

An MEA was prepared in the same way as in Comparative Example 1 except that the following processes (ix) to (xii)

were carried out after the process (1)(viii) of Comparative Example 1 and before the process (2) of Comparative Example 1, and a noble-metal-supported catalyst PtCo/C modified with PTFE, prepared in the following process (xii), was used instead of the noble-metal-supported catalyst PtCo/C in the process (2)(i).

(ix) First, 30 g of Fluorinert FC-72 (manufactured by 3M Japan Ltd.) as an inert solvent and 0.02 g of CEFRAL LUBE V (manufactured by Central Glass Co., Ltd.) as a PTFE powder were placed in a 100 ml beaker, and mixed together by stirring at room temperature for 15 minutes to obtain a dispersion.

(x) Then, 100 g of Fluorinert FC-72 (manufactured by 3M Japan Ltd.) and 3 g of the noble-metal-supported catalyst PtCo/C obtained in the process (1)(viii) of Comparative Example 1 were placed in a 200 ml beaker, and mixed together by stirring at room temperature for 15 minutes to obtain a dispersion.

(xi) Then, the dispersion obtained in the process (ix) and the dispersion obtained in the process (x) were mixed together by stirring at room temperature for 30 minutes to obtain a mixed solution.

(xii) Then, the mixed solution obtained in the process (xi) was evaporated to dryness (approximately 120 minutes) at 50° C. to prepare a noble-metal-supported catalyst PtCo/C modified with PTFE,

COMPARATIVE EXAMPLE 5

MEA Prepared Using Electrode Catalyst Including PtCo-supported Mesoporous Carbon A and PTFE of 10% by Wight with Respect to Total Weight of Mesoporous Carbon A and PTFE {Weight of PTFE (Weight of Mesoporous Carbon A+Weight of PTFE)×100=0}

An MEA was prepared in the same way as in Comparative Example 4 except that 0.2 g of CEFRAL LUBE V was used instead of 0.02 g of CEFRAL LUBE V in the process (ix) of Comparative Example 4.

COMPARATIVE EXAMPLE 6

MEA Prepared Using Electrode Catalyst Including PtCo-supported Mesoporous Carbon C and PTFE of 5% by Wight with Respect to Total Weight of Mesoporous Carbon C and PTFE {Weight of PTFE/(Weight of Mesoporous Carbon C+Weight of PTFE)×100=5}

An MEA was prepared in the same way as in Comparative Example 4 except that the mesoporous carbon C was used instead of the mesoporous carbon A in the process (1)(i) of Comparative Example 1 cited in Comparative Example 4, and 0.2 g of CEFRAL LUBE V was used instead of 0.02 g of CEFRAL LUBE V in the process (ix) of Comparative Example 4.

Example 1

MEA Prepared Using Electrode Catalyst Including PtCo-supported Mesoporous Carbon A and PTFE of 5% by Wight with Respect to Total Weight of Mesoporous Carbon A and PTFE {Weight of PTFE/(Weight of Mesoporous Carbon A+Weight of PTFE)×100=5}

An MEA was prepared in the same way as in Comparative Example 4 except that 0.1 g of CEFRAL, LUBE V was used instead of 0.02 g of CEFRAL LUBE V in the process (ix) of Comparative Example 4.

Example 2

MEA Prepared Using Electrode Catalyst Including PtCo-supported Mesoporous Carbon B and PTFE of 5% by Wight with Respect to Total Weight of Mesoporous Carbon B and PTFE {Weight of PTFE/(Weight of Mesoporous Carbon B+Weight of PTFE)×100=5}

An MEA was prepared in the same way as in Comparative Example 4 except that the mesoporous carbon B was used instead of the mesoporous carbon A in the process (1)(i) of Comparative Example I cited in Comparative Example 4, and 0.1 g of CEFRAL LUBE V was used instead of 0.02 g of CEFRAL LUBE V in the process (ix) of Comparative Example 4.

Example 3

MEA Prepared Using Electrode Catalyst Including PtCo-Supported Mesoporous Carbon B and PTFE of 3% by Wight with Respect to Total Weight of Mesoporous Carbon B and PTFE {Weight of PTFE/(Weight of Mesoporous Carbon B+Weight of PTFE)×100=3}

An MEA was prepared in the same way as in Comparative Example 4 except that the mesoporous carbon B was used instead of the mesoporous carbon A in the process (1)(i) of Comparative Example 1 cited in Comparative Example 4, and 0.06 g of CEFRAL LUBE V was used instead of 0.02 g of CEFRAL LUBE V in the process (ix) of Comparative Example 4.

Example 4

MEA Prepared Using Electrode Catalyst Including PtCo-Supported Mesoporous Carbon B and PTFE of 7% by Wight with Respect to Total Weight of Mesoporous Carbon B and PTFE {Weight of PTFE/(Weight of Mesoporous Carbon B+Weight of PTFE)×100=7}

An MEA was prepared in the same way as in Comparative Example 4 except that the mesoporous carbon B was used instead of the mesoporous carbon A in the process (1)(i) of Comparative Example I cited in Comparative Example 4, and 0.14 g of CEFRAL LUBE V was used instead of 0.02 g of CEFRAL LUBE V in the process (ix) of Comparative Example 4.

Table I indicates the pore volume of pores having a pore size of 2 nm to 5 nm in the mesoporous carbon used in each of the MEAs of Comparative Examples 1 to 6 and Examples 1 to 4.

TABLE 1

| | Pore volume of pores having pore size of 2 nm to 5 nm (mL/g) |
|---|---|
| Comparative Examples 1, 4, 5 Example 1 | 2.4 |
| Comparative Example 2 Examples 2 to 4 | 2.1 |
| Comparative Examples 3, 6 | 1.5 |

2. Sample Evaluation

Example 5

Current-Voltage (1-V) Measurement

On the MEAs prepared in Comparative Examples 1 to 6 and Examples 1 to 4. I-V measurement was carried out under conditions involving 65° C., the absence of cathode humidification, a back pressure of 210 kPa, a cathode stoichiometric ratio of 3, and a measurement apparatus (apparatus manufactured by Toyo Corp.), to measure a voltage value at a current density of 1 A/cm².

The results are shown in Table 2 and FIG. 1. From Table 2 and FIG. 1, it is evident that, in the MEAs each prepared using the mesoporous carbon A or the mesoporous carbon B, the voltage varied remarkably depending on the amount of modifying PTFE. 3 the optimum amount of PTFE was 3% by weight to 7% by weight with respect to the total weight of the mesoporous carbon and the water-repellent material (PTFE). In the MEAs prepared using the mesoporous carbon C, the voltage did not vary depending on the amount of modifying PTFE with which the noble-metal-supported catalyst was modified.

Example 6

Water Vapor Adsorption-Desorption Isotherm Measurement

Adsorption and desorption isotherms were measured on the noble-metal-supported catalyst or the noble-metal-supported catalyst modified with PTFE, used for preparing each of the MEAs of Comparative Examples 1 to 6 and Examples 1 and 2. Measurement conditions will be indicated below.

Measurement Conditions
The measurement conditions were as follows.
Adsorption temperature: 323.15 K
Adsorbate: pure water
Saturated vapor pressure: 12.344 kPa
Adsorbate sectional area: 0.125 nm²
Equilibration time (waiting time after adsorption equilibrium was attained): 500 seconds
Adsorbate molecular weight: 18.020
Measurement apparatus: BELSORP-aqua3 (manufactured by MicrotracBEL Corp.)
Pretreatment apparatus: BELPREP-vacll (manufactured by MicrotracBEL Corp.)

For each catalyst, a ratio of an amount of adsorbed water vapor at a point that is on the obtained desorption isotherm and that corresponds to a relative pressure of $P/P_0=0.75$ with respect to an amount of adsorbed water vapor at a point that is on the obtained adsorption isotherm and that corresponds to a relative pressure of $P/P_0=0.75$ (an amount of adsorbed water vapor at the time of desorption an amount of adsorbed water vapor at the time of adsorption) [hereinafter, referred to as a water vapor adsorption-desorption hysteresis value] was calculated.

Figure 2:
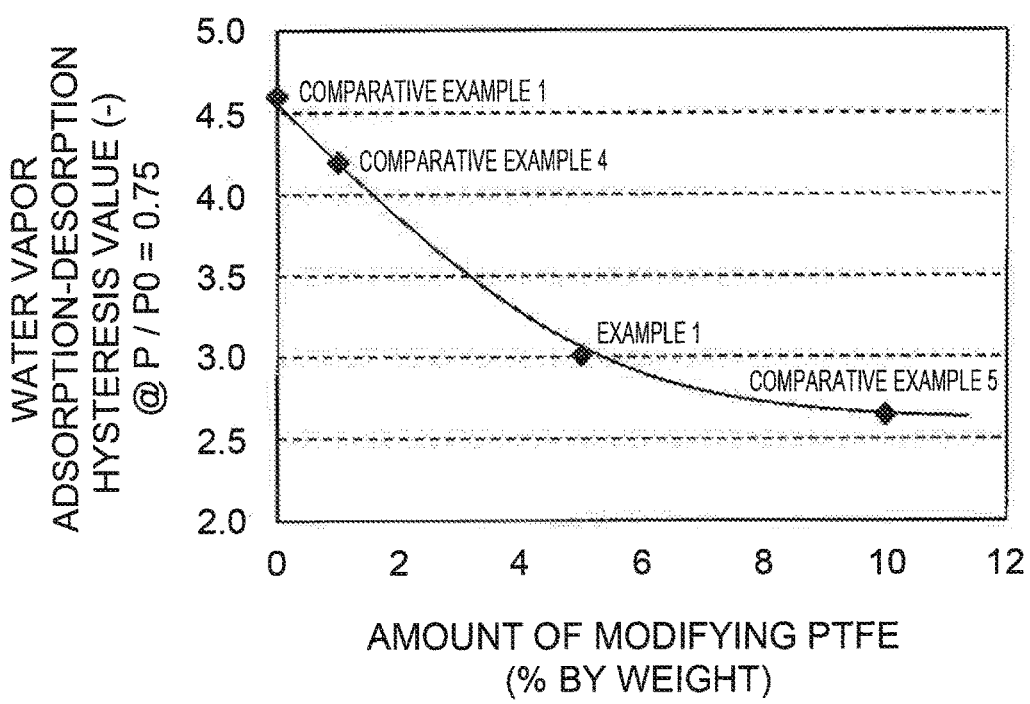
FIG. 2 is a diagram showing the relationship between the amount of modifying PTFE with which the noble-metal-supported catalyst was modified, and the water vapor adsorption-desorption hysteresis value, in each of electrode catalysts used in the MEAs of Comparative Examples 1, 4, and 5 and Example 1.

The results are shown in Table 2 and FIG. 2. From Table 2 and FIG. 2, it is evident that the water vapor adsorption-desorption hysteresis value was decreased until the amount of modifying PTFE with which the noble-metal-supported catalyst was modified became 10% by weight with respect to the total weight of the mesoporous carbon and the PTFE. An experiment was carried out also on a catalyst in which the amount of modifying PTFE with which the noble-metal-supported catalyst was modified was 20% by weight with respect to the total weight of the mesoporous carbon and the PTFE. As a result, the water vapor adsorption-desorption hysteresis value was equivalent to that of the catalyst in which the amount of modifying PTFE is 10% by weight (not shown in FIG. 2).

Example 7

Gas Diffusion Resistance Measurement

Figure 3:
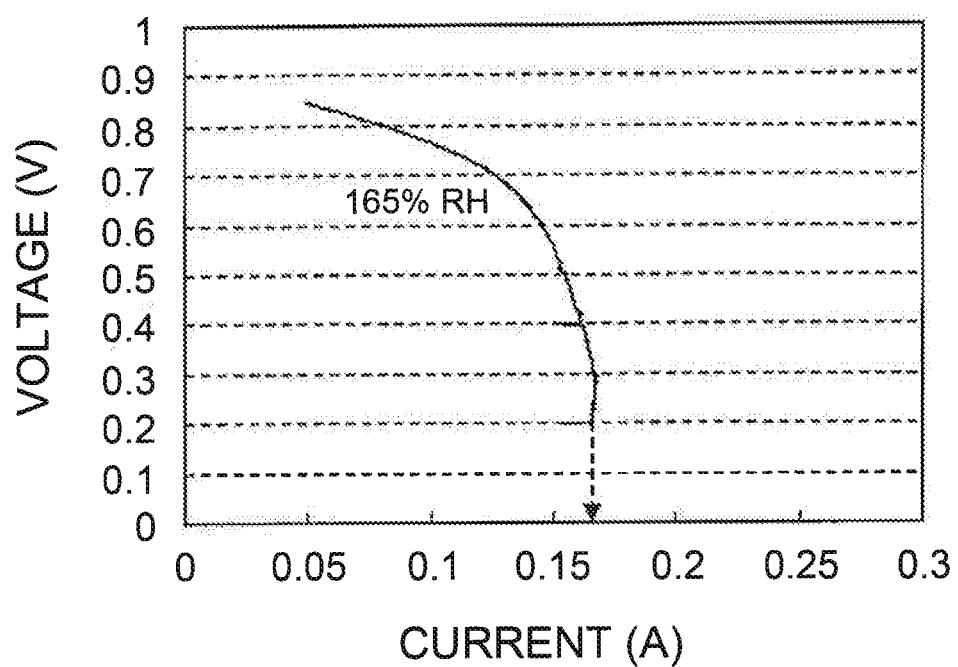
FIG. 3 is a diagram showing the relationship between the current and the voltage in an MEA under conditions of 45° C., 165% RH, and a low oxygen concentration, in a gas diffusion resistance measurement.

On the MEAs prepared in Comparative Examples 1, 4, and 5 and Example 1, I-V measurement was carried out under conditions involving 45° C., 165% RH, a low oxygen concentration (oxygen concentration: 1%), and a measurement apparatus (apparatus manufactured by Toyo Corp.). Gas diffusion resistance was calculated according to the following expression from a critical current density (FIG. 3):

$$R_{total} = \frac{P_{O2}}{I_{lim}/4F \times RT}$$

In the expression, $R_{total}$ represents gas diffusion resistance, $I_{lim}$ represents critical current density, F represents Faraday constant, R represents gas constant, T represents absolute temperature, and $P_{O2}$ represents oxygen partial pressure.

Figure 4:
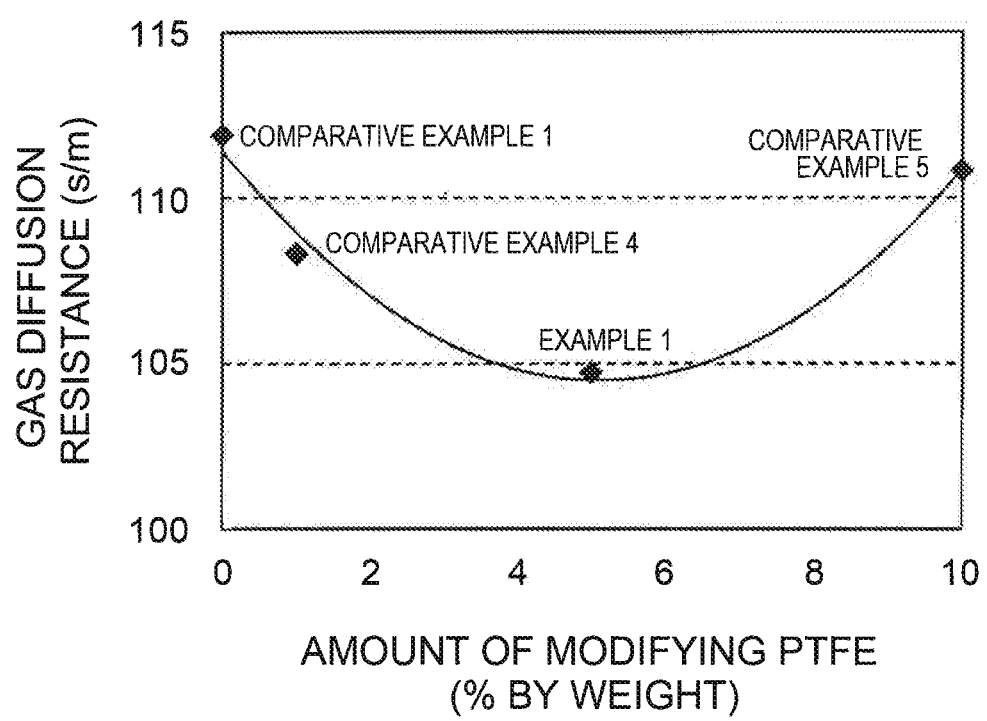
FIG. 4 is a diagram showing the relationship between the amount of modifying PTFE with which the noble-metal-supported catalyst was modified, and gas diffusion resistance, in each of the MEAs of Comparative Examples 1, 4, and 5 and Example 1.

The results are shown in Table 2 and FIG. 4. From Table 2 and FIG. 4, it is evident that the gas diffusion resistance was decreased until the amount of modifying PTFE with which the noble-metal-.supported catalyst was modified became 5% by weight with respect to the total weight of the mesoporous carbon and the PTFE, whereas the gas diffusion resistance was increased when the amount of modifying PTFE was 10% by weight with respect to the total weight of the mesoporous carbon and the PTFE. When the amount of modifying PTFE is 10% by weight, an excess of PTFE is considered to inhibit gas diffusion.

Figure 5:
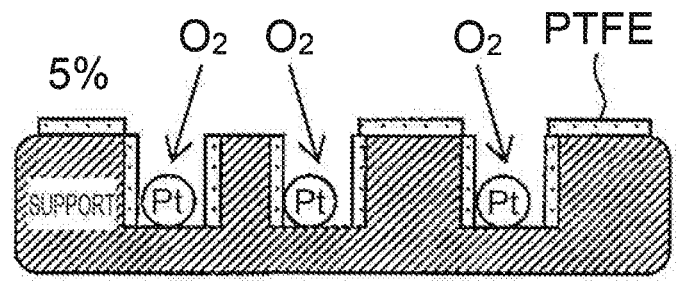
FIG. 5 is a schematic view of a noble-metal-supported catalyst modified with PTFE in each of the MEAs of Example 1 and Comparative Example 5.
Figure 5:
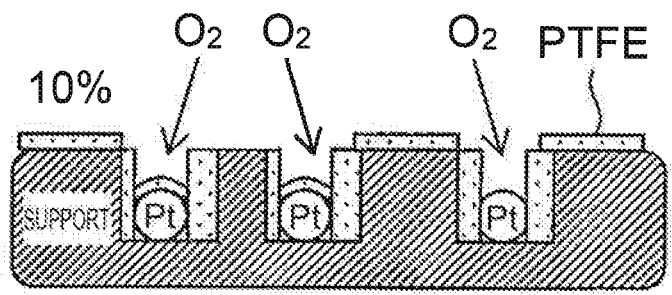
Figure 6:
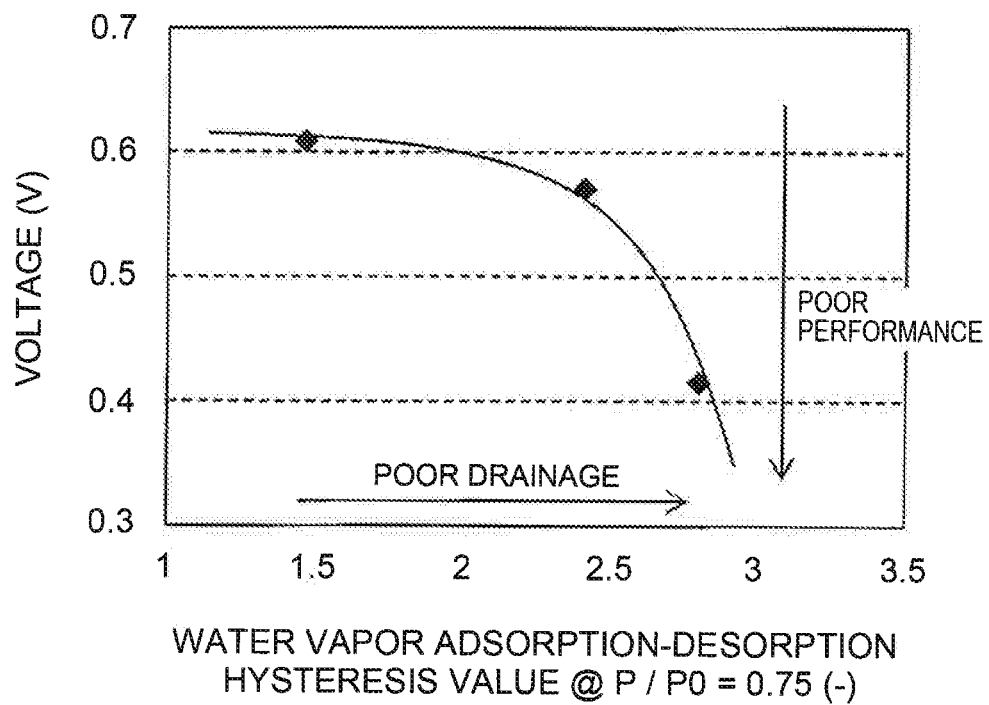
FIG. 6 is a diagram showing the relationship between the water vapor adsorption-desorption hysteresis value of a catalyst and the voltage in an MEA.

FIG. 5 shows a schematic view of the noble-metal-supported catalyst modified with PTFE in the MEAs obtained in Example 1 and Comparative Example 5.

Table 2 indicates the results of evaluations in Examples 5 to 7.

TABLE 2

| | Type of mesoporous carbon | Pore volume of pores having pore size of 2 nm to 5 nm (ml/g) | Amount of modifying PTFE (% by weight) | Voltage (V) | Water vapor adsorption-desorption hysteresis value (—) @P/P0 = 0.75 | Gas diffusion resistance (s/m) |
|---|---|---|---|---|---|---|
| Comparative Example 1 | A | 2.4 | 0 | 0.415 | 4.6 | 111.9 |
| Comparative Example 2 | B | 2.1 | 0 | 0.410 | 4.3 | — |
| Comparative Example 3 | C | 1.5 | 0 | 0.609 | 1.9 | — |
| Comparative Example 4 | A | 2.4 | 1 | 0.524 | 4.2 | 108.3 |

TABLE 2-continued

| | Type of mesoporous carbon | Pore volume of pores having pore size of 2 nm to 5 nm (ml/g) | Amount of modifying PTFE (% by weight) | Voltage (V) | Water vapor adsorption-desorption hysteresis value (—) @P/P0 = 0.75 | Gas diffusion resistance (s/m) |
|---|---|---|---|---|---|---|
| Comparative Example 5 | A | 2.4 | 10 | 0.389 | 2.6 | 110.8 |
| Comparative Example 6 | C | 1.5 | 5 | 0.624 | 1.8 | — |
| Example 1 | A | 2.4 | 5 | 0.690 | 3.0 | 104.7 |
| Example 2 | B | 2.1 | 5 | 0.670 | 2.9 | — |
| Example 3 | B | 2.1 | 3 | 0.648 | — | — |
| Example 4 | B | 2.1 | 7 | 0.625 | — | — |

What is claimed is:

1. A fuel cell electrode catalyst comprising:
a noble-metal-supported catalyst including a carbon support and a noble metal supported on the carbon support; and
a water-repellent material with which the noble-metal-supported catalyst is modified, wherein
the carbon support is mesoporous carbon in which a pore volume of pores having a pore size of 2 nm to 5 nm is 2.1 ml/g to 2.4 ml/g,
said pore volume is a cumulative value of the logarithmic derivative pore volumes, dV/d(logD), within a range of the pore sizes, D, from 2 nm to 5 nm,
the noble metal consists of a platinum cobalt alloy,
an amount of the noble metal is 0.03 mg to 0.3 mg per cm$^2$ of electrode,
an amount of the water-repellent material is 3% by weight to 7% by weight with respect to a total weight of the mesoporous carbon and the water-repellent material, and
the water-repellent material is selected from one of polytetrafluoroethylene, tetrafluoroethylene-perfluoroalkyl vinyl ether copolymer, and tetrafluoroethylene-hexafluoropropylene copolymer.

2. The fuel cell electrode catalyst according to claim 1, wherein the mesoporous carbon is coated with the water-repellent material at a thickness of 1 nm or less.

3. The fuel cell electrode catalyst according to claim 1, wherein the mesoporous carbon is prepared by heat treatment at a burning temperature of 1700° C. or higher and lower than 2300° C. or by heat treatment at a burning temperature of 1500° C. or higher and lower than 2100° C.

* * * * *